Jan. 2 1968   A. J. DE MARIA   3,361,987
POLY-SIDED FOLDED PATH LASER
Filed Nov. 29, 1963

INVENTOR
ANTHONY J. DeMARIA
BY David S. Fishman
ATTORNEY

United States Patent Office 3,361,987
Patented Jan. 2, 1968

3,361,987
POLY-SIDED FOLDED PATH LASER
Anthony J. De Maria, West Hartford, Conn., assignor to United Aircraft Corporation, East Hartford, Conn., a corporation of Delaware
Filed Nov. 29, 1963, Ser. No. 326,877
3 Claims. (Cl. 331—94.5)

ABSTRACT OF THE DISCLOSURE

A laser element comprising a polysided body of laser material in which a number of sides of the body serve as reflecting surfaces for total internal reflection of the electromagnetic radiation in a folded path.

---

This invention relates to a new laser geometry. More particularly, this invention relates to a new geometry for an active laser element whereby a significant increase is achieved in the effective active media length between the reflectors of a laser, especially lasers employing solids or liquids as the amplifying medium.

The problems involved in growing and fabricating optical maser (laser) crystal rods of long length and good optical quality are well known to those skilled in the art. The present invention achieves the effect of a long active medium without having to construct rods of long length, and the present invention achieves this highly desirable result through the employment of a new configuration for the active laser element. In the present invention the body of active laser material is a polysided body in which a number of the sides serve as reflecting surfaces for total internal reflection so that the electromagnetic radiation in the laser material is internally reflected and is caused to follow a folded path whereby it is reflected internally of the body many times while traveling between the usual reflecting end plates. The elongated path of travel of the internal electromagnetic radiation resulting from the several internal reflections results, in effect, in a significant increase in the length of the amplifying medium of the active laser material and, therefore, results in a significant increase in gain in the laser element.

Accordingly, one object of the present invention is to produce a new laser geometry which generates an emergent beam of higher intensity than would otherwise be achieved for a given pumping energy.

Another object of the present invention is to produce a novel laser element in which the internal electromagnetic radiation is reflected internally of the element to lengthen the path of the electromagnetic radiation travel in the element.

Still another object of the present invention is to produce a novel laser element in which the internal electromagnetic radiation is caused to travel in a folded path through the element by internal reflection.

Other objects and advantages will be apparent from the specification and claims, and from the accompanying drawings which illustrate an embodiment of the invention.

Figure 1:
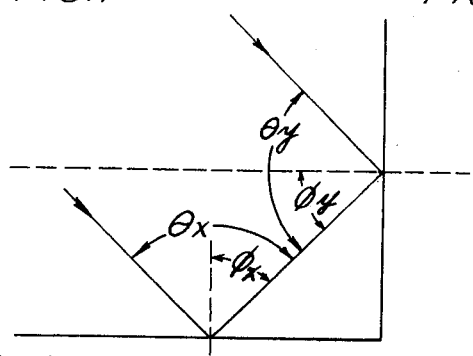
FIG. 1 is a diagrammatic representation of internal electromagnetic radiation reflection in the laser element of the present invention.

An appreciation of the advantages resulting from the increase in effective length of the amplifying medium can be gained from a short summary of the operation of lasers. The intensity of a light beam of wave length $\lambda_0$ in passing through a medium of any length X having two energy levels separated by $1/\lambda_0$ wave numbers and connected by allowable quantum transistions is given by $$I = I_0 e^{-\alpha X} \quad (1)$$

where $I_0$ = the intensity of the light beam before entering medium.
$I$ = the intensity of the light beam as a function of its position X in the active medium.
$\alpha$ = the gain/absorption constant of the active medium $$\alpha = \frac{2}{\Delta \nu}\sqrt{\frac{\ln 2}{\pi}} \frac{\lambda_0^2}{8\pi} \frac{g_2}{g_1} \frac{N_1 - N_2}{\tau} \quad (2)$$

where $\Delta \nu$ = the width of the spectral line in c.p.s. (a Gaussian shape is assumed).
$g_1, g_2$ = statistical weights of the lower and upper quantum states, respectively.
$N_1, N_2$ = the number of atoms per cc. in the lower and upper states, respectively.
$\tau$ = the lifetime of the spontaneous emission of the upper state.

If there are more atoms in the lower state than in the upper state $N_1 - N_2$ is positive so that $\alpha$ is positive and absorption results (see Equation 1). If there are more atoms in the upper state than in the lower state, $\alpha$ is negative, the exponent of Equation 1 becomes positive, and there is a gain in the medium. This, of course, is a condition required for laser action.

In the usual case of laser oscillators, two flat reflecting plates are placed parallel to each other at each end of a medium of length D. A photon starting out anywhere in the active medium and traveling parallel to the axis of the system will be amplified until it reaches the reflector. At this point some energy is reflected back and some is transmitted through the reflector. A steady oscillation can be built up if the amplification during passage of the wave is enough to make up for the losses in reflection. If the reflectivity of the mirror is R, the condition required for steady oscillation is (for negative $\alpha$)

$$e^{-(-\alpha)D} = e^{\alpha D} \geq 1/R \quad (3)$$

The overpopulation required for maser action is $$N_2 - N_1 \geq \frac{8\pi \tau \Delta \nu g_1 \ln\left(\frac{1}{R}\right)}{2\sqrt{\frac{\ln 2}{\pi}} \lambda_0^2 g_2 D} \quad (4)$$

Equation 1 shows that the output power is exponentially dependent on the length of the active medium for any given gain coefficient $\alpha$. The gain coefficient (Equation 2) is fixed for any given optical pumping intensity per unit volume of active laser medium used. An increase of output power can be obtained by increasing the optical pumping intensity per unit volume (increasing $N_2 - N_1$), but then heat dissipation becomes a serious problem. Once the problem of heat dissipation dominates, a situation which is frequently encountered because of the low efficiency of these quantum devices, the only recourse for obtaining higher power output is to increase the length of the active laser material.

Equation 3 shows that the reflectivity required for sustaining laser action drops off exponentially as a function of length D for any given $\alpha$. This exponential relationship also insures greater power output with increasing length because a smaller amount of positive feedback is required to keep the oscillator functioning, and therefore a greater amount of the total energy is available as output energy.

Equation 4 shows that the amount of overpopulation between the $N_2$ and $N_1$ energy levels required for laser action is inversely proportional to the length D of the active laser material. This results in a lower firing threshold energy for the device as length is increased.

Equations 1, 3 and 4 clearly show the advantages of having as long an active laser medium as possible between the usual two end reflectors of the Fabry-Perot cavity. The present invention accomplishes the desired objectives of an elongated active laser medium through a laser configuration which utilizes complete internal reflection to cause the electromagnetic radiation to travel through the laser medium several times in different reflected paths in the transition from one end reflector to the other, the total path of electromagnetic radiation travel having the same volume per unit path length of active laser medium as the usual rod configuration.

The utilization of the internal reflection folded path configuration of the present invention presents the problem of discriminating against unwanted modes that take other than the desired path through the laser medium and become trapped within the medium. The radiation stimulated by these modes does not appear as output power, and these modes thus represent a loss to the system which must be eliminated. However, this problem can be solved by a consideration of the angles of reflection involved in the behavior of a light ray internally reflected successively by two mutually perpendicular surfaces. Referring to FIG. 1, the sum of the angles of reflection $(\theta_y+\theta_x)$ of a light ray internally reflected successively by two mutually perpendicular surfaces is 180°. Assuming for purposes of illustration that the laser element is a ruby in an air medium, the critical angle $\phi_c$ for total internal reflection for a ruby-air interface is approximately 34.5°. This means that modes intersecting the ruby-air interface at angles smaller than 34.5° will be attenuated; modes intersecting their first ruby-air interface at angles larger than 55.5° $(90°-\phi_c)$ will experience total internal reflection, but will intersect the next ruby air-interface at an angle smaller than 34.5° and will also be highly attenuated. Modes intersecting a ruby-air interface between 34.5° $(\phi_c)$ and 55.5° $(90°-\phi_c)$ will have a high gain (high Q) and will be trapped, an exception being the 45° mode. However, the angular bandwidth $(\Delta\phi=90°-2\phi_c)$ within which the undesired modes occur decreases with increasing critical angles required for total internal reflection so that $$\Delta\phi \to 0 \text{ as } \phi_c \to 45° \quad (5)$$

Thus, the unwanted modes can be attenuated or eliminated by creating an interface between the laser element and a medium of the proper index of refraction, $n'$, such that the critical angle $\phi_c$ for total internal reflection approaches or becomes 45° from the relationship $$\sin \phi_c = \frac{n'}{n_{laser}} = \frac{\sqrt{2}}{2} \quad (6)$$

With a ruby laser element, a medium having an index of refraction of approximately 1.25 is required, and the desired ruby-medium interface can be achieved by immersing the laser element in liquid oxygen.

Figure 2:
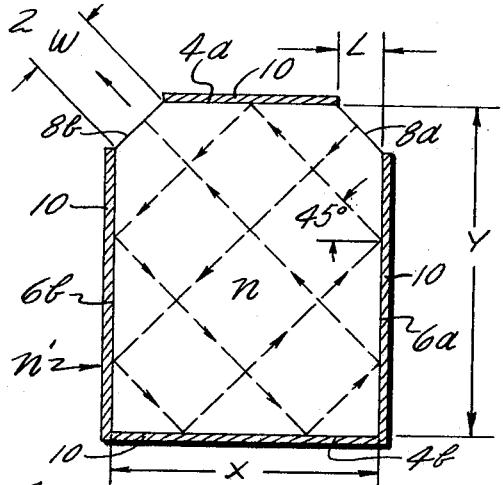
FIGS. 2 through 5 are examples of a laser configuration of the present invention.

Referring now to FIG. 2, the active ruby laser element 2 is shown in elevation. Laser element 2 is of constant cross section in the direction extending into or out of the plane of the paper, and may be described generally as being of rectangular cross section with two adjacent corners of the rectangle cut away. More particularly, the laser element has a first pair of opposed parallel sides 4a and 4b, side 4a being smaller than side 4b and being centrally positioned with respect to side 4b, a second pair of opposed parallel sides 6a and 6b, sides 6a and 6b being perpendicular to side 4b and extending toward side 4a, and a third pair of sides 8a and 8b extending from side 4a to sides 6a and 6b, respectively. Sides 6a and 6b are of equal length as are sides 8a and 8b, and sides 8a and 8b are inclined at an angle of 45° to lines extending from sides 6a and 6b. The side surfaces 4a, 4b, 6a, 6b, 8a and 8b are all themselves in the form of rectangles and are all of high optical flatness. The sides 4a, 4b, 6a and 6b all have deposited thereon or are in contact with a medium 10 having an index of refraction $n'$ selected with respect to the index of refraction $n$ of element 2 such that the critical angle $\phi_c$ for total internal reflection approaches or becomes 45° from Equation 6 above. The sides 8a and 8b are of width W and correspond to the usual end reflectors of a laser element; accordingly, the sides 8a and 8b have reflective coatings thereon with one side, side 8a for purposes of illustration, being more reflective than the other.

Pumping light incident on element 2 in a direction perpendicular to the plane of the paper will cause photons to travel from end reflector 8a in a direction perpendicular thereto side 6b where total internal reflection will take place and cause reflection in the direction of the arrow to side 4b where total internal reflection will again take place and cause reflection in the direction of the arrows toward side 6a where total internal reflection will again occur and cause reflection in the direction of the arrows toward side 4a, and thence in the direction of the arrows to side 6b, and thence in the direction of the arrows to side 4b, and thence in the direction of the arrows to side 6a, and thence toward side 8b in a direction perpendicular thereto from which the output beam of laser element 2 will emerge. The output beam will have a width W and will be of much higher intensity than would otherwise have been realized from the given amount of pumping energy as a result of the above-described long path of travel through element 2, the path of travel being indicated by the broken lines and arrows.

The cross sectional dimensions of the laser element, i.e., the length of the various sides can be determined by a series of relationships. Assuming that the desired width of the emergent beam is W, sides 8a and 8b should be equal to W, and the dimension L indicated in FIG. 1, which is one half of the difference between the lengths of sides 4a and 4b, is equal to $W/\sqrt{2}$. The distance X, the length of side 4b and also the distance between sides 6a and 6b, is then KL where K is an even number (2, 4, 6, 8, etc.). The ditsance Y between sides 4a and 4b is then $X\pm L$, and the total path length through element 2 is then $$W(K^2\pm K-1)$$

the sign between $K^2$ and K in the path length formula corresponding to the sense of the sign between X and L in the relationship $Y=X\pm L$.

Figure 3:
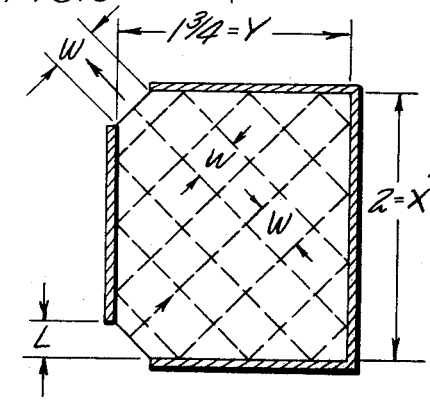
Figure 4:
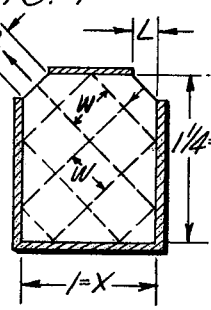
Figure 5:
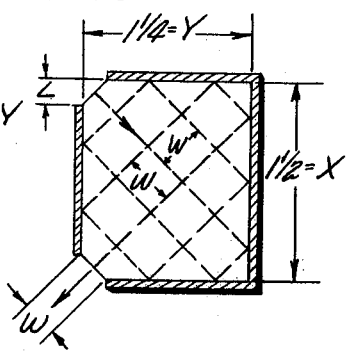

FIGS. 3, 4 and 5 show three alternative configurations for element 2 based on the expressions listed immediately above. In FIG. 3, L is one-quarter unit, X is two units (8L), and Y is one and three-quarters units $(X-L)$ in FIG. 4, L is again one-quarter unit, X is one unit (4L), and Y is one and one-quarter units $(X+L)$. In FIG. 5, L is again one-quarter unit, X is one and one-half units (6L) and Y is one and one-quarter units $(X-L)$.

Of course, it will be understood that the laser element could be of other cross sectional shapes than that shown. For example, it could be pentagonal, septagonal, octagonal, etc., depending on the location of the window from which the bear emerges and on the value of the angle $\phi_c$ for total internal reflection. Also, the embodiment shown can operate with only one corner cut away.

Figure 6:
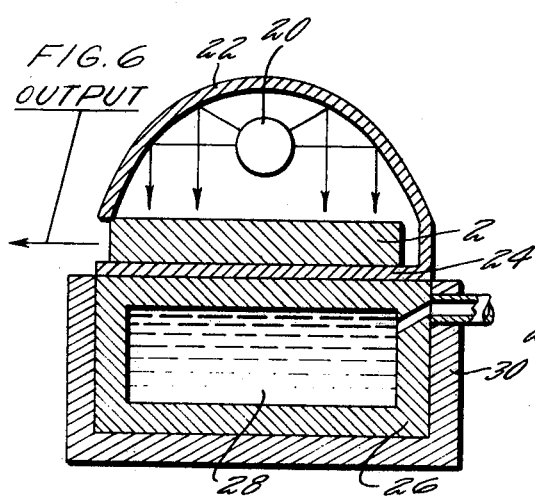
FIGS. 6 and 7 are schematic representations in section of laser systems incorporating the laser element of the present invention.
Figure 7:
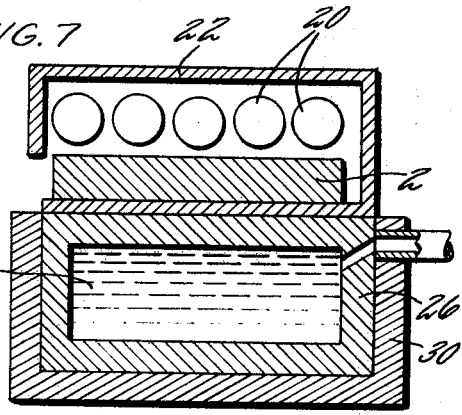

Referring now to FIGS. 6 and 7, two representative systems are shown in which the laser element of the present invention can be operated. In FIG. 6 a source of pumping light 20 is positioned at the focal point of parabolic reflector 22 which serves to deliver the pumping light in parallel paths to laser element 2. Reflecting surface 24 supports laser element 2 and cooperates with the parabolic reflector to supply the pumping light to the laser. A heat conducting copper container 26 having a standing or circulating coolant therein such as liquid nitrogen is employed in cooling the laser element. The copper container is itself within an opened top insulating container 30.

It is well know that higher power output results when the active medium of a solid laser device is cooled to low temperatures, the increased power output resulting from decreasing line with (Δν, see Equation 2) and increasing quantum efficiency with decreasing temperature. However, conduction cooling must be employed in cooling laser devices to low temperatures (below 77° K.), since the flash lamps such as pumping lamp 20 usually use xenon as a gas medium and care must be employed in not liquefying the xenon gas. The relatively large top and bottom surfaces of the present laser element are, as can be seen in FIG. 6, readily adaptable to effective conduction cooling wherein the entire bottom surface is in heat exchange communication with coolant 28. Thus, an additional power output advantage is realized with the present laser element since the desired cooling can be more readily achieved.

The system shown in FIG. 7 differs from FIG. 6 only in that a bank of lamps 20 are employed in conjunction with a reflector 22 of rectangular configuration. All other elements of FIG. 7 are similar to the corresponding elements of FIG. 6. It will be understood that the systems shown and described in FIGS. 6 and 7 are merely illustrations of systems in which effective use can be made of the conduction cooling capabilities of the present laser element.

It is to be understood that the invention is not limited to the specific embodiment herein illustrated and described but may be used in other ways without departure from its spirit as defined by the following claims.

I claim:

1. A laser material comprising:
   a polysided body of active laser material having a first pair of opposed parallel sides of unequal length,
   a second pair of opposed parallel sides extending from the longer side of said first pair of opposed sides toward the shorter side of said first pair of opposed sides, said second pair of opposed sides being perpendicular to the longer side of said first pair of opposed sides.
   a third pair of equal length sides, each one of which joins one side of said second pair of opposed sides to the shorter side of said first pair of opposed sides, said third pair of sides being reflecting surfaces of different degrees of reflectivity,
   means in contact with said first and second pairs of opposed sides to establish a critical angle of 45° between the index of refraction of said laser material and said first and second pairs of opposed sides,
   the distance X, between said second pair of sides being equal to $$K\frac{W}{\sqrt{2}}$$

where K is an even number, and W is the length of one side of said third pair of sides, and wherein the distance Y, between said first pair of sides is equal to $$X \pm \frac{W}{\sqrt{2}}$$

said third pair of sides cooperating with said first and second pairs of opposed sides to define a path of electromagnetic radiation reflection internally of said active laser material longer than the length of any of said sides.

2. A laser element as in claim 1 wherein the length of said internal path is equal to $W(K^2+K-1)$ when Y is equal to $$X + \frac{W}{\sqrt{2}}$$

3. A laser element as in claim 1 wherein the length of said internal path is equal to $W(K^2-K-1)$ when Y is equal to $$X - \frac{W}{\sqrt{2}}$$

References Cited

UNITED STATES PATENTS 3,248,671   4/1966   Dill et al. _____ 331—94.5

JEWELL H. PEDERSEN, *Primary Examiner.*

E. S. BAUER, R. L. WIBERT, *Assistant Examiners.*